(12) United States Patent
Schnitzer et al.

(10) Patent No.: US 7,777,671 B2
(45) Date of Patent: *Aug. 17, 2010

(54) RADAR SYSTEM AND METHOD

(75) Inventors: Itzhak Schnitzer, Haifa (IL); Avner Rosenberg, Bet She'arim (IL); Alon Deutsch, Kiryat Motzkin (IL)

(73) Assignee: Rafael-Armament Development Authority, Ltd, Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/179,763

(22) Filed: Jul. 12, 2005

(65) Prior Publication Data

US 2007/0013577 A1 Jan. 18, 2007

(51) Int. Cl.
*G01S 7/292* (2006.01)
*G01S 13/00* (2006.01)

(52) U.S. Cl. .................. 342/193; 342/90; 342/27

(58) Field of Classification Search .................. 342/90, 342/193

See application file for complete search history.

(56) References Cited

U.S. PATENT DOCUMENTS

| | | | | |
|---|---|---|---|---|
| 4,053,891 A | * | 10/1977 | Opitz | 342/193 |
| 4,648,124 A | * | 3/1987 | Mantovani et al. | 455/67.13 |
| 5,191,343 A | * | 3/1993 | Danzer et al. | 342/21 |
| 5,904,210 A | * | 5/1999 | Stump et al. | 175/45 |
| 6,057,765 A | * | 5/2000 | Jones et al. | 340/572.2 |
| 6,163,259 A | | 12/2000 | Barsumian et al. | |
| 6,512,475 B1 | * | 1/2003 | Bogatyrev et al. | 342/22 |
| 2003/0179126 A1 | * | 9/2003 | Jablonski et al. | 342/22 |

FOREIGN PATENT DOCUMENTS

| EP | 0 812 028 B1 | 8/2005 |
|---|---|---|
| WO | WO 02/39140 | 5/2002 |

OTHER PUBLICATIONS http://en.wikipedia.org/wiki/Radar_signal_characteristics; searching for "pulse envelope" gave this site first (Google, on Sep. 2009)—1 page.
Introduction to Radar Systems, 2nd Edition (1962), by Merrill Skolnik, several citations therein—a portion of chapter 2.5; a portion from p. 208; a portion from p. 316; a portion of chapter 10.5; a portion from pp. 362-363; and a portion from p. 431.

* cited by examiner

*Primary Examiner*—Thomas H Tarcza
*Assistant Examiner*—Matthew M Barker
(74) *Attorney, Agent, or Firm*—Roach Brown McCarthy & Gruber, P.C.; Kevin D. McCarthy

(57) ABSTRACT

The invention relates to a radar system which comprises: (a) at least two transmitting units for simultaneously, and in synchronization transmitting electromagnetic radiation in distinct frequencies $f_1, f_2, f_3 \ldots$ towards a space of interest; and (b) at least one receiving unit tuned to a frequency of $nf_1+mf_2+qf_3\ldots$, wherein $n, m, q \ldots$ being integers not equal to zero, for receiving a non-linear response of said radiation from objects located within the said space of interest.

25 Claims, 6 Drawing Sheets

RADAR SYSTEM AND METHOD

FIELD OF THE INVENTION

The invention generally relates to a method and system for detecting and locating man-made objects by means of a "harmonic radar" utilizing the objects non-linear response to incident electromagnetic waves.

BACKGROUND OF THE INVENTION

Radar systems are widely used for detecting and locating objects. Radar systems usually operate in the UHF (Ultra-High-Frequency) or microwave part of the RF (Radio-Frequency) spectrum, and are used to determine the position and/or movement of an object. There have been developed various types of radar systems, for different purposes and applications.

Any radar system can locate a target by finding its direction and range. The range to an object is determined by calculating the delay between a pulse transmitted by the system, and the consequential receipt of the reflection of said pulse from the object. This determination is based on the known propagation velocity of the pulse c (the speed of light), when the air is the medium. As a general rule, for obtaining a relatively good range resolution, a very short pulse should be transmitted. The duration of the pulse may be shortened by any known compression technique.

Metal junctions and electronic components, particularly those containing semiconductors, have a non-linear response to the application of voltage over them. This physical phenomenon is known in the art for several decades, and has been used, for example, in systems for detecting and locating mines. In these cases, the current I via a metal or a semiconductor junction can be expressed by the following equation:

$$I = I_0 + g_1 V + g_2 V^2 + g_3 V^3 + \ldots \quad (1)$$

The coefficient $g_1$ in this equation expresses conductance, while the other terms represent the coefficients of the non-linear response of the object to the application of voltage over it. Typically, the values of the coefficients $g_n$ decrease as the order of the coefficient index n increases. The said phenomenon is used by object detection systems to remotely detect and characterize man-made objects which are made of metals or contain semiconductor components. Generally, such systems transmit electromagnetic waves towards the object, that induce voltages over the metal or the semiconductor junctions of it. These voltages induce currents according to equation (1), which cause radiation that can be detected by a receiving portion of the system. The radiation contains information regarding the non-linear characteristics of the object, that are characterized by the distinct relative levels of coefficients $g_n$.

In most radar applications, a sinusoidal or a quasi-sinusoidal wave is transmitted towards the object. Assuming that a wave $V \cos(2\pi ft)$ is transmitted, the scattered non-linear response from a man-made object contains harmonics of the transmitted frequency f namely, 2f, 3f, 4f, 5f, .... The reflections from natural objects, however, are linear, i.e., include only the fundamental transmitted frequency f. Also, if the transmission contains more than one frequency, the response contains various combinations of the transmitted frequencies.

Man-made objects that do create harmonic scattering can be divided into two classes:

One. Man-made metal objects: Due to an oxidized layer formed on most metals, junctions of metals are essentially combinations of metal-oxide-metal (MOM), which cause a symmetrical non-linear re-radiation of the applied voltage (by "symmetrical", it is meant that $I(V) = -I(-V)$). Due to the symmetrical structure of man-made metal objects, the harmonic response contains only odd harmonics: 3f, 5f, 7f, ....

Two. Man-made semiconductor junctions: Semiconductor junctions, existing, for example, in diodes and transistors, are essential to the operation of electronic instruments, and cause non-linear re-radiation. As is known, this non-linearity is not symmetrical, namely, $|I(V)| \neq |I(-V)|$. Therefore, the scattering from electronic components contain the fundamental frequency and its entire harmonics, odd and even, i.e., 2f, 3f, 4f, 5f, 6f, 7f ....

From the above, it is clear that a harmonic radar can detect man-made objects, and can even distinguish between metal objects and objects that contain electronic components.

A few general properties of the harmonic response should be noted:

One. Frequency dependence: Physically, there is no known low boundary to the linear response from typical objects. In practice, it is difficult to concentrate low frequency radiation on targets, and also the coupling is not efficient (the term "coupling" refers to the ratio between the voltage induced on a component inside the target object and between the intensity of the electromagnetic field surrounding the target object). On the other hand, parasitic capacitance of the junctions that are part of the object, for example, PN junctions in semiconductor components within the object, metal-semiconductor junctions, or metal-oxide-metal junctions, tend to short the voltage in high frequencies. More particularly, as the frequency increases, a lower amplitude response is scattered from a man-made object. Harmonic radar systems using frequencies ranged from a few tens of MHz up to about 10 GHz have been applied for various radar applications. However, second harmonic generation by metal-oxide-metal (MOM) diode made by dissimilar metals or metal-oxide semiconductor (MOS) diodes have been demonstrated up to 30 THz (teraherz) using $CO_2$ laser (by F. Kneubel et al., ETH, Zurich).

Two. Power Dependence: As a general rule, the re-radiation from man-made objects in each harmonic is proportional to the incident power raised by the n-th power, n is approximately equal to the harmonic order. For example, if the incident power is P, the scattering from the object in the second harmonic 2f is approximately proportional to $P^2$.

Three. Order Dependence: The higher the harmonic order, the lower the response from the object.

Harmonic radar systems utilizing the above phenomena are used in the art, generally for short-range detection and location of objects, typically in ranges of between several centimeters, up to several kilometers. Such systems, when applied to detect objects in ranges of several kilometers require transmission of very high power.

Parasitic harmonic signals that are developed in the transmitting unit cause significant problems in distinguishing the searched objects from their surrounding. For example, the operation of a transmitter is accompanied by many non-linear electromagnetic components, particularly in the amplifier or the oscillator, that produces radiation. Also, metal junctions in the antenna and the transmission lines may create odd harmonics. Furthermore, corona formation in the transmitter caused by the high transmitted power might create harmonics of all orders. Harmonics of the fundamental transmitting frequency which are produced in the transmitter are then transmitted towards the object, together with the main transmission in the fundamental frequency. These transmitted harmonic frequencies are scattered by all objects and may mask the expected scattered harmonic signals from the non-linear objects, and prevent their detection and investigation. Moreover, the transmitter platform may contain metallic materials and electronic devices which may, by themselves generate harmonic signals, that may be confused with the harmonics scattered by the objects. This is a particular problem when using antennas having strong side-lobes, that cause problems in short-range detection in any type of radar system.

It is an object of the invention to provide a method and system for detecting and locating man-made objects using harmonic detection.

It is another object of the invention to provide a harmonic radar method and system for detecting and locating man-made objects at close-range.

It is still an object of the invention to provide a harmonic radar method and system enabling better distinction of the searched man-made objects from their surroundings, particularly when parasitic harmonics are generated at the transmitting and receiving units, and at the carrying platform.

It is a particular object of the invention to provide a harmonic radar method and system for locating man-made objects in very high precision, namely, with high range and azimuth resolution.

It is still a particular object of the invention to provide a method and system for precisely locating man-made objects buried in the ground.

It is still a particular object of the invention to provide a method and system for remotely classifying man-made objects. The term "classifying" refers herein to the ability to distinguish and classify the type of the target detected, for example, to distinguish between a mine, tank, missile, etc.

Other objects of the invention will become apparent when the description proceeds.

SUMMARY OF THE INVENTION

The present invention relates to a radar system which comprises: (a) at least two transmitting units for simultaneously, and in synchronization transmitting electromagnetic radiation in distinct frequencies $f_1$, $f_2$ $f_3$ ... towards a space of interest; and (b) At least one receiving unit tuned to a frequency of $nf_1+mf_2+qf_3$ ..., wherein n, m, q ... being integers not equal to zero, for receiving a non-linear response of said radiation from objects located within the said space of interest.

Preferably, the following condition $n\neq 1$, $m\neq 1$, and $q\neq 1$ ... also applies.

Preferably, the following condition $n\neq -1$, $m\neq -1$, $q\neq -1$ ... also applies.

Preferably, the receiving unit is tuned to receive at least two frequencies $n_1f_1+m_1f_2+q_1f_3$ ..., and $n_2f_1+m_2f_2+q_2f_3$ ..., wherein $n_1, m_1, q_1 ..., n_2, m_2, q_2 ...$, are integers and at least $n_1\neq n_2$ or $m_1\neq m_2$.

Preferably, the system further comprises evaluating means for evaluating the relative intensity of a response from an object in said two received frequencies, and for classifying accordingly the type of the object.

In an embodiment of the invention, the system may comprise two transmitters for simultaneously and in synchronization transmitting electromagnetic radiation in two distinct frequencies $f_1$, $f_2$ towards a space of interest, and one receiving unit for receiving at a frequency of $n_1f_1+m_1f_2$, n, m, being integers not equal to zero.

Preferably, each transmitting unit comprises a transmitter and a transmitting antenna, and each receiving unit comprises a receiver and a receiving antenna.

Preferably, the at least two antennas of the transmitting units and the at least one antenna of the receiving unit are mounted on a same carrier, and all said antennas are directed in a synchronized manner to simultaneously scan essentially a same space of interest.

In one embodiment of the invention, the transmissions from the transmitting antennas are orthogonally polarized one with respect to the other, for eliminating the production of parasitic signal components at the frequency to which the receiving unit is tuned.

Preferably, the said orthogonal polarization is used for eliminating transmission of signals at the frequency of the receiving unit from any of the transmitting units.

Preferably, the orthogonal polarization is performed by means of a polarizing component located between one of the transmitters and its corresponding antenna.

Preferably, the antennas of the transmitting units and of the at least one receiving unit are all mounted on a same antenna pedestal, to be directed simultaneously to a same direction.

Preferably, a multi-beam antenna is used at the receiving unit for improving the direction resolution.

The transmission frequencies $f_1$, $f_2$, $f_3$ ... may be selected to be in the range of between 30 MHz to 30 THz, depending on the purpose for which the system is used.

In one embodiment of the invention, $f_1$, $f_2$, $f_3$ ... are in the microwave frequency range.

The invention also relates to a method for detecting man-made objects comprising the steps of: (a) simultaneously transmitting from a first transmitting unit and from a second transmitting unit, and optionally from more transmitting units electromagnetic radiation in frequencies of $f_1$, $f_2$, $f_3$ ... respectively towards a space of interest; (b) receiving by a receiving unit reflections from objects in said space of interest in a frequency of $nf_1+mf_2+qf_3$ ... wherein n, m, q ... are integers not equal to zero.

Preferably, the following condition $n\neq 1$, $m\neq 1$, $q\neq 1$ ... also applies.

Preferably, the following condition $n\neq -1$, $m\neq -1$, $q\neq -1$ ... also applies.

Preferably, the receiving unit is tuned to receive at at least two frequencies $n_1f_1+m_1f_2+q_1f_3$ ..., and $n_2f_1+m_2f_2+q_2f_3$ ..., wherein $n_1, m_1, q_1 ..., n_2, m_2, q_2 ...$, are integers and at least $n_1\neq n_2$ or $m_1\neq m_2$.

Preferably, the method of the invention further comprises the steps of: (a) carrying out repeated experiments for determining a typical response for each of various types of objects, while using selected transmitted frequencies $f_1$, $f_2$, $f_3$ ... in each transmission unit respectively; (b) for each object type, recording in a database its typical received response to said transmitted frequencies; and (c) when receiving a response from a real object to a simultaneous transmission of same selected frequencies, correlating the response as received with each of said typical records in the database, to find the type having most similarity, and classifying the object type accordingly.

Preferably, the electromagnetic radiation is transmitted in pulses.

Preferably, a receiving gate is provided at the receiver for enabling reception during the expected time of receipt of a response from an object, and disabling receipt in all other times.

Preferably, the pulses are short duration pulses, obtained by means of compression.

Preferably, the electromagnetic radiation is a continuous transmission.

Preferably, the transmitted frequencies are varied continuously, and the receiving frequency being also varied to follow the said variation of said two transmitting frequencies.

Preferably, the method also comprises the masking the leakage of signal components in the frequency transmitted from any transmitting unit to the other transmitting units.

Preferably, the method also comprises the providing to the receiving unit indication regarding the time of the simultaneous transmission of by the transmitting units for determining the location of the object.

DETAILED DESCRIPTION OF PREFERRED EMBODIMENTS

As said, the invention relates to a radar system for detecting, locating, and classifying man-made objects, that scatter signals at harmonic frequencies of the transmitted frequency due to their non-linear scattering characteristics, as mentioned in equation (1) above. Harmonic radar systems of the prior art comprise at least one transmitting unit, and a receiving unit. Each transmitting unit in harmonic radar systems of the prior art transmits a signal (a short pulse or a continuous wave) at a frequency f and the receiving unit of such systems is tuned to receive a signal from the object at a harmonic frequency off namely, a frequency nf, wherein n is an integer. Generally, in view of the fact that the intensity of harmonics re-radiated by the object decreases as the harmonic order increases, it is common to tune the receiver to a low n-order harmonic. As the receiving unit tries to detect low-intensity signals at a specific harmonic of the transmitted frequency, any parasitic signal in said harmonic frequency might cause confusion at the receiver in distinguishing real objects from their surroundings. Unfortunately, it has been found in harmonic radars of the prior art that signals in harmonic frequencies nf of the fundamental frequency f do develop at the transmitting unit/s and leak to the receiving unit, despite the means that are generally provided in such systems to eliminate such leakage. Harmonic components of the fundamental transmitting frequency that are parasitically produced at the transmitter are then transmitted towards all objects within the antenna beam width, together with the main signal at the fundamental frequency. These transmitted harmonic frequencies, scattered by all objects, may mask the expected harmonic signals from the non-linear objects, and prevent their detection and investigation. Moreover, the transmitting unit contains metallic materials which may, by themselves re-radiate harmonic signals, that might be confused with the real harmonics reflected from the objects. This is a particular problem in antennas having strong side-lobes, that cause problems in short-range detection in any type of radar system. The system of the invention provides a solution to this problem, and significantly improves the distinction between harmonics re-radiated by real objects and other parasitic harmonics. Moreover, the method and system of the present invention provides the ability to classify targets.

Figure 1:
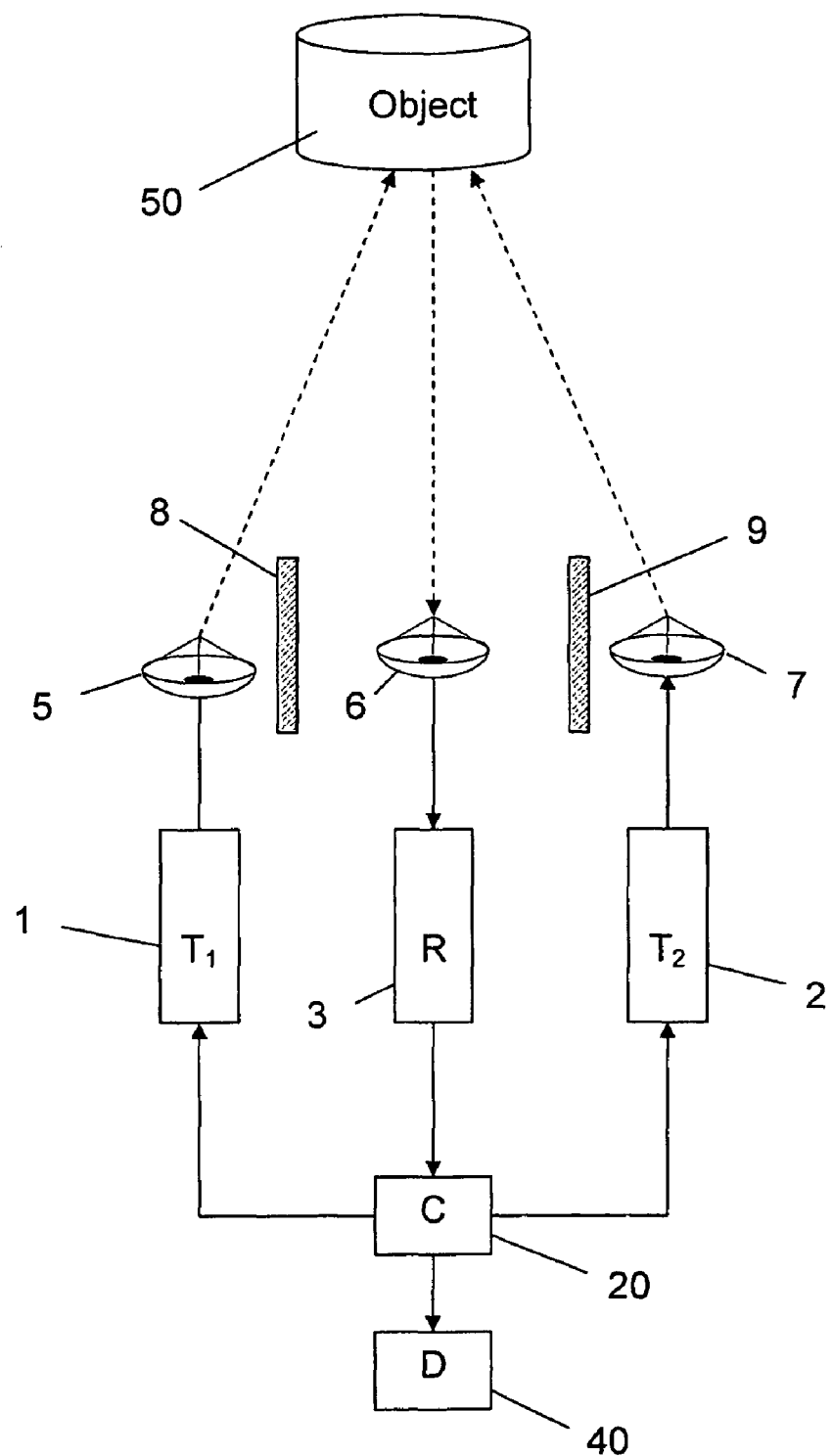
FIG. 1 shows a general structure of the harmonic radar system according to one embodiment of the invention.

FIG. 1 illustrates a basic block diagram of a radar system for detecting man-made objects, according to one embodiment of the invention.

According to an embodiment of the invention the system comprises at least two transmitters 1 and 2, transmitting simultaneously at different frequencies $f_1$ and $f_2$, respectively. Each transmitter feeds an antenna, transmitter 1 feeds antenna 5, and transmitter 2 feeds antenna 7. The transmitter may comprise a magnetron-type oscillator, CFA (Cross-Field Amplifier), Klystron or TWT (Traveling Wave Tube) or Gyrotron amplifiers, solid-state amplifiers, or any other kind of amplifier or oscillator producing electromagnetic waves.

The system also comprises at least one receiving antenna 6, feeding at least one receiver 3. Said receiver is tuned to at least one of the frequencies that are produced by man-made objects as a result of said simultaneous transmission, namely, $nf_1 + mf_2$, wherein n and m are any integers that are positive, negative, but not zero.

All the three antennas 5, 6, and 7 are directed so that they cover simultaneously essentially a same area of interest. The antennas may be fixed, or preferably mounted on a same pedestal for scanning simultaneously the same area of interest. Alternatively, each antenna may be mounted on a separate pedestal, while a central unit is used for keeping all the antennas directed to the same direction during scanning. The isolators 8 and 9 are used for preventing leakage of electromagnetic radiation from one transmitter to the other, and between the transmitters 1 and 2 and the receiver 3.

Figure 2:
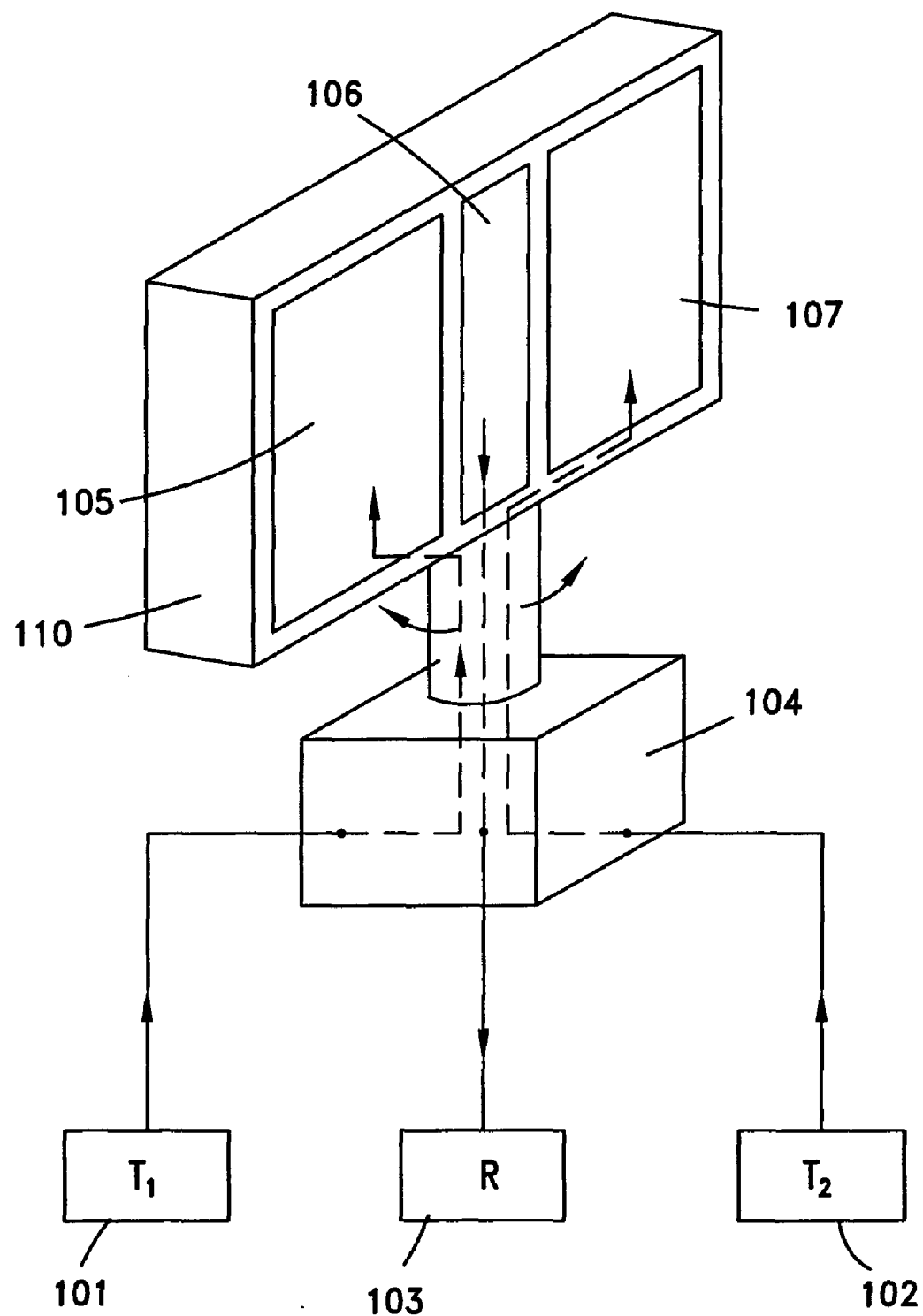
FIG. 2 shows an antenna adapted for transmitting signals from two transmitting units, and receiving a signal from as target which is conveyed into a receiving unit, according to one embodiment of the invention.

FIG. 2, shows an embodiment of the invention in which of all the antennas are mounted on a same pedestal. All the three antennas 105, 106, and 107 are mounted on a same frame 110, and rotated together by means of common pedestal 104. The energy transmitted from transmitters 101 and 102 to the antennas, and the received energy going from antenna 106 to receiver 103, go through the pedestal by means of either a standard rotary joint or flexible cables (not shown).

Figure 3:
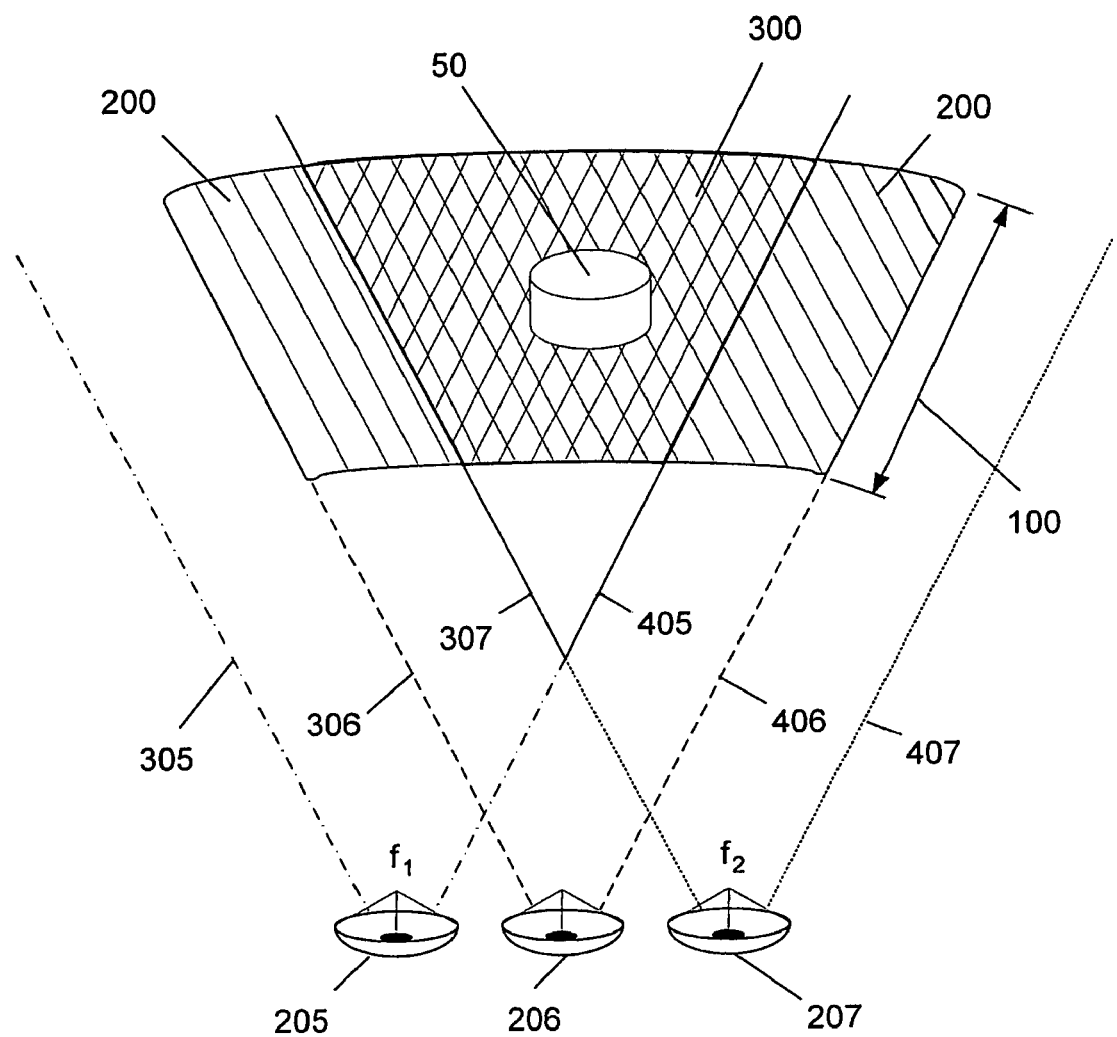
FIG. 3 shows an object that is radiated by simultaneous transmissions from two transmitting units having different transmission frequencies.

The transmission of transmitters 1 and 2 (FIG. 1) may be continuous or pulsed. Pulse transmission is preferred when a range resolution is of high importance. For pulse transmission, a timing pulse is provided by control unit 20, which synchronizes the simultaneous transmission of transmitters 1 and 2. The result of the described antenna structure and simultaneous transmission is that only in a limited volume of space the two signals in the two transmitted frequencies $f_1$ and $f_2$ exist simultaneously. FIG. 3 describes that schematically. Antenna 205 has a beam width 305 to 405, Antenna 207 has beam width 307 to 407, and the pulse duration in space is indicated by numeral 300. So, at a given time, the only volume of space that contains simultaneous transmission of $f_1$ and $f_2$ is indicated by numeral 300. Therefore, only man-made objects, such as object 50 that are within the volume 300 will produce non-linear response at frequencies $nf_1 + mf_2$. Receiving antenna 206 having a beam width between 306 to 406 defining a volume of space 200 that includes within it the space 300, is used for receiving the non-linear response in frequency $nf_1+mf_2$ (as said, $n,m\neq 0$) from man-made object 500 which is located within space 300.

The received signal is filtered and amplified by receiver 3 (FIG. 1) that is tuned in a manner known in the art to one selected frequency $f_3=nf_1+mf_2$. Once a signal at frequency $nf_1+mf_2$ is detected by receiver 3, the control unit 20 provides any type of suitable and conventional indication on display 40.

Besides detection of a man made target, the system can also determine the location of that target. The accuracy of the location of the target is relative to the minimal beam width each of each of the three antennas 205, 206, and 207 (FIG. 3), and to the pulse duration 100. The receiver 3 in FIG. 1 delivers the detected target signal to control unit 20. The control unit measures the delay T between the transmission of the pulse and the detection of a signal from the target. The said delay T, multiplied by light velocity c, and divided by 2 is the range to the target; The delay T may be measured by conventional techniques, such as linear frequency modulation (LFM), when chirped transmitters are employed.

Control unit 20 can display the direction of the target OB and the range on display 40. The direction to the target OB is the determined by the overlapping directions of the three antennas 205, 206, and 207.

The above method for locating an object by combining the separate determination of the range and the azimuth to the object is well known in the art, and essentially forms the basis of almost any radar system. Therefore, it will not be discussed herein in more detail.

However, in the present invention, the use of at least two transmitted frequencies $f_1$ and $f_2$, which are simultaneously present only at a limited space portion, ensures that only within that space portion electromagnetic components in frequency combinations of $nf_1+mf_2$, while $n\neq 0$ and $m\neq 0$ can be created by man-made objects. In the prior art, where only one frequency $f_1$ is transmitted, harmonics $nf_1$ can be created at the man-made target, but almost always these harmonics are present also in the transmitted signal, and that generally masks the target and limits the detection sensitivity.

According to the present invention, the receiver is tuned to at least one of the frequency combinations $nf_1+mf_2$, ($n\neq 0$ and $m\neq 0$. The coefficients m and n are positive or negative integers, and therefore the receiver is tuned to, for example, $f_1\pm f_2$, $2f_1\pm f_2$, $f_1\pm 2f_2$, . . . etc. Moreover, according to the present invention, $f_1$ and $f_2$ are selected so that $Pf_1\neq nf_1+mf_2$, and $Qf_2\neq nf_1+mf_2$ for any integers P and Q, while $nf_1+mf_2$ is the frequency to which the receiver is tuned. That selection assures that harmonics $Pf_1$ and/or $Qf_2$ generated at the transmitters, will not mask the detection of the desired signal having harmonic frequency/s of $nf_1+mf_2$.

EXAMPLE

The following is an example for an efficient frequency selection that provides a system having high sensitivity to the detection of man-made objects. According to this example the transmitting frequencies are $f_1$=2.74 GHz, $f_2$=1.26 GHz, and the reception frequency is $f_r$=4.0 GHz (being the sum $f_1+f_2$. In that case the harmonics created at the transmitter 2 are in frequencies 5.48 GHz, 8.22 GHz, 10.96 GHz, . . . etc., and the harmonics created at the transmitter 1 are in the frequencies 2.52 GHz, 3.78 GHz, 5.04 GHz, . . . , etc. It has been demonstrated that in this example the receiving frequency, when properly selected, is remote enough from each of the transmitting frequencies, and/or from any of their harmonics. Therefore, the sensitivity and the ability of the system to distinguish man-made target from their surroundings are improved.

In one preferred embodiment of the invention, the system of the invention comprises more than two transmitting units, transmitting at more than two frequencies, and more than one receiving units receiving at more than one receiving frequency. Each receiving frequency is a combination of the transmitting frequencies. Such a system is capable of obtaining more information about the targets, and has an improved sensitivity and a reduced false alarm rate.

While it is better to separate transmitters and transmitting antennas, which transmit high power, in order to reduce the risk of producing target-like signals in the transmitted spectrum, in receiving, where power levels are very low, a single antenna and receiver may be used instead of a plurality of such units. To enable receiving and detection at more than on frequency, a broad band antenna and front-end amplifier in the receiver may be applied. Then by standard techniques, several frequencies may be filtered each into a separate detection channel.

Figure 4:
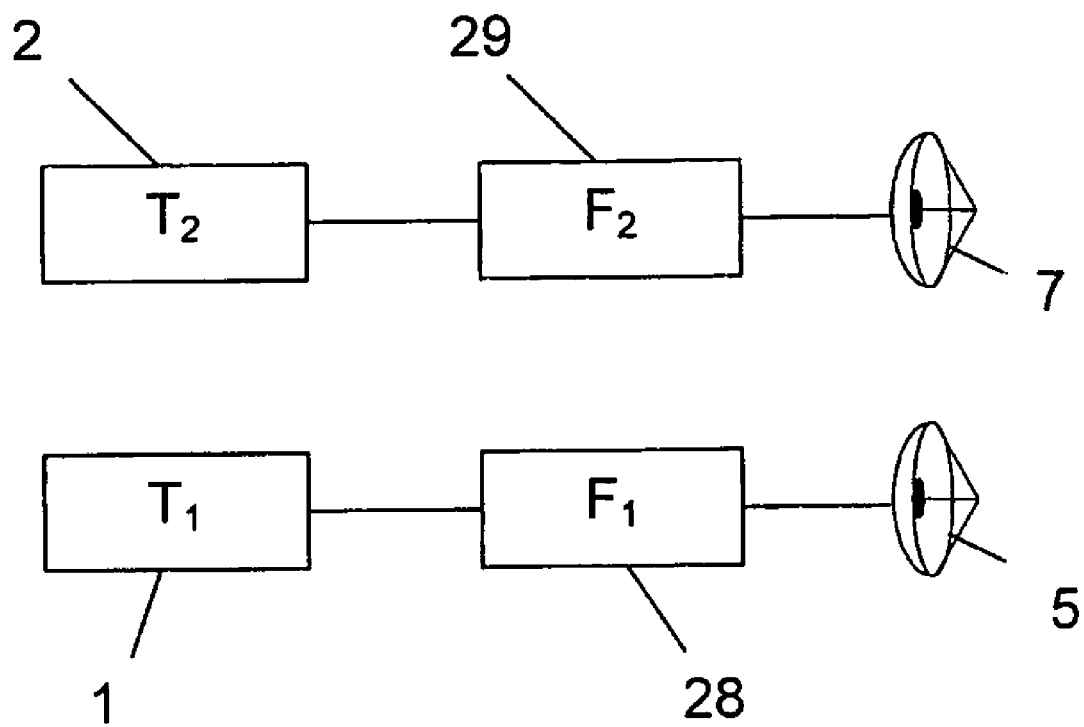
FIG. 4 shows how a leakage of radiation between two transmitting units is obtained by means of providing filters between each transmitter and its corresponding antenna.

As said, in order to obtain a powerful harmonic return, it is desired to transmit as high power as possible by the transmitters 1 and 2. Any coupling between the antennas 5, 6, and 7, even a weak one, may cause leakage of energy between the two transmitters, that will produce signal components being combinations of a plurality of the transmitting frequencies, and these signal components may radiate from the transmitting antennas 5, and 7, and received by antenna 6. As said, it is very important that such frequency combinations will be produced only or mainly at the target. A reduction of the coupling between the antennas can be obtained by the introduction of the buffers 8,9, (FIG. 1) between the antennas made of absorbing materials. In another embodiment of the invention, the two transmitting antennas 5, and 7 are built to produce signals that are orthogonally polarized. This reduces the coupling between the antennas 5 and 7 to a minimum. Furthermore, two filters 28 and 29 (shown in FIG. 4) that pass only the frequency of transmission of the relevant transmitter may be correspondingly introduced between each transmitter and its antenna in order to further eliminate leakage of energy in one transmitting frequency from a first transmitter, to the second transmitter transmitting in a second frequency.

Figure 5:
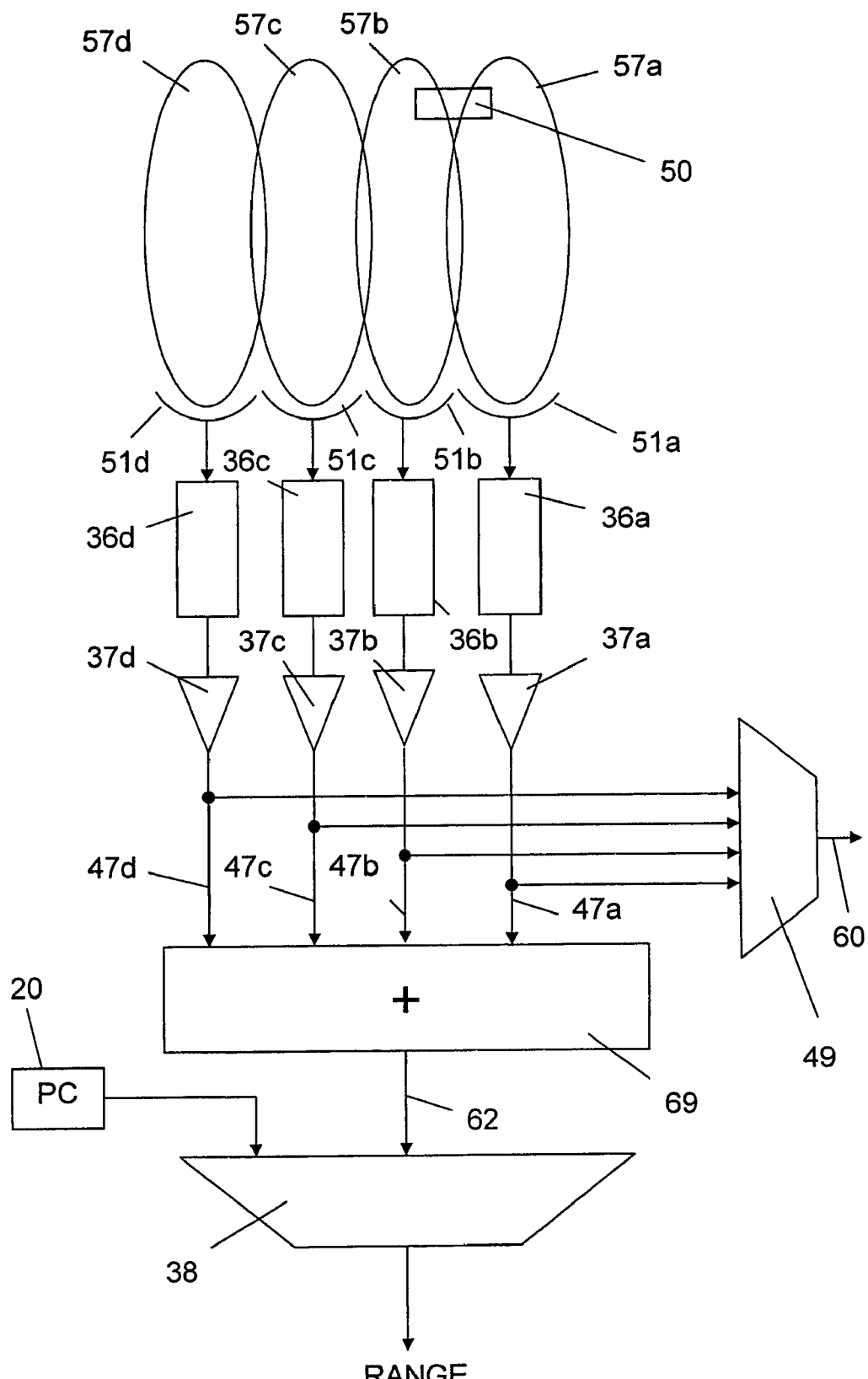
FIG. 5 shows how a location of an object 50 is obtained by means of using a plurality of receiving units and/or receiving antennas.

As said, the azimuth to the object depends on the directivity of the antennas, and also on the receiving frequency. Therefore, it is preferable to use a high receiving frequency, for example $f_1+f_2$=4 GHz. Furthermore, as shown in FIG. 5, in a preferred embodiment of the invention the locating of the object 50 is improved by means of using a plurality of receiving units and/or receiving antennas. In the embodiment of FIG. 5, four receiving units having respectively four antennas 51a-51d are used. Each of said antennas has a narrow receiving lobe 57a-57d slightly displaced one with respect to the other. The received signals are correspondingly passed in the corresponding receivers through filters 36a-36d, allowing signals only in the receiving frequency to pass. The signals are then amplified by amplifiers 37a-37d and conveyed to both the azimuth processing unit 49, and to summing unit 69. The azimuth processing unit 49, which is given the four signals 47a-47d compares the relative intensity of the signals from the four amplifiers 37a-37d, and determines from it the azimuth to the object relative to the lobes direction of each of the antennas. In FIG. 5, there are four antenna lobes 57a-57d. When the object 50 is positioned between the two lobes 57a and 57b as shown, only signals 47a and 47b will essentially be received, and therefore it can be concluded that the object 50 is located within the azimuth covered by the antennas 55a and 55b, and not within the azimuth covered by antennas 55c and 55d. Moreover, the relative values of the signals 47a and 47b may provide even a better distinction relating to the azimuth. The signals 47a-47d are also summed by summing unit 69, and a pulse 62 resulting from this summation is provided to the range processing unit 38. The range processing unit 38 also receives a reference pulse from the control unit 20, and by carrying out timing comparison between these two pulses it determines in a conventional manner the range to the object 50.

As mentioned, the intensity of the scattered harmonic signals is approximately proportional to the $|n|+|m|$ power of the intensity of the transmitted signals. More specifically, if $P_1$ and $P_2$ are the transmitted powers of the signals in frequencies $f_1$ and $f_2$ respectively, then the received signal at frequency $nf_1+mf_2$ is approximately proportional to $P_1^{|n|} \cdot P_2^{|m|}$. Therefore, in the system of the invention there is a significant advantage to the transmission of as high power as possible. Furthermore, the required bandwidth at the receiver is inversely proportional to the duration of the transmitted pulse. As the noise at the receiver is proportional to the bandwidth, it can be noted that the level of the noise is inversely proportional to the transmitted pulse duration. Therefore, it follows that there is an advantage in the use of a narrow pulse with high amplitude in comparison to a wider pulse with a same energy.

One common compact way for obtaining a very narrow pulse with high amplitude is the application of pulse compression technique. For example, a 1 MW pulse having a duration of 27 s can be compressed to a pulse of 100 MW with duration of 10 nsec. Such compression techniques are known in the art. Moreover, it is obvious and known in the art that the use of shorter pulses provides better range resolution, and this is another motivation for the use of shorter pulses.

Furthermore, a range gate may be used in the receiver if the transmission pulse duration is shorter than the time required for the pulse to reach the target and return to the receiver. Such a gate when used, opens the receiver during the time expected for the returned pulse to reach the receiver, and prevents the clutter reception.

Design considerations: An exemplary case is provided herein, where 1 μsec pulses are transmitted by two transmitters, with a power of each pulse of about 1 MW ($P_1=P_2=1$ MW). If the pulses are compressed to 10 nsec each, while keeping the same energy in each pulse, and power of $P_1=P_2=100$ MW, the power of the received signal at a frequency $f_1+f_2$ will be 10,000 times stronger. In such a case, the receiver should use a matched filter having a band width of about $1/10$ n sec=100 MHz instead of a matched filter for a 1 μsec pulse, i.e., having a bandwidth of 1/1 μsec=1 MHz, as had to be originally used with no compression. Therefore, it has been shown that the compression of the transmitted pulses by a factor of 100 increases the power of the received pulses by a factor of 10,000, while the noise is increased by a factor of only 100. In other words, an improvement of 100 fold is obtained by the compression in the signal-to-noise ratio and in the detection sensitivity.

On the other hand, a too much compression of the transmitted pulses, may increase too much their spectral content, which may cause great difficulties in separating the target signal from the transmitted signal. In the above example, a 10 nsec pulse includes most its spectral content within 100 MHz, and is well separated from the received signal. However, if, for example, a 1 nsec pulse were used, its spectral width will be about 1 GHz and the separation between the transmitted signal at a central frequency of 2.5 GHz and the received signal at a central frequency of 4 GHz (also with a filter of 1 GHz width in the receiver) will not be sufficient.

In some applications there may be advantage for using the harmonic radar system of the invention in much higher frequencies, up to 30 THz. One application in the high frequency band (30 GHz to 30 THz) can be the detection of defects in microelectronic components, similar to the detection of concealed objects (for example, mines or explosive charges) in the lower band (30 MHz to 30 GHz).

Classification of Targets: The ability to classify targets is another aspect of the present invention. As mentioned above, a metal object creates mostly odd harmonics (weak even harmonics are re-radiated by dissimilar metallic junctions), while solid-state junctions (PN), typical of electronic components, produce all (even and odd) harmonics. More specifically, if the transmitted frequencies are $f_1$ and $f_2$, a receipt of a signal at $nf_1+mf_2$ where n+m is even is a strong indication of a target that contains electronics.

Moreover, different classes of targets have a different nonlinear response to incident frequencies. These differences are manifested in the relative intensities of the scattered frequencies $nf_1+mf_2$, while operating with an embodiment of the invention. By receiving more than one response, for example, one in frequency $n_1 f_1+m_1 f_2$ and a second in frequency $n_2 f_1+m_2 f_2$, and comparing the intensities of these two response signals, it is possible to classify the targets.

Other means for target classification may be the harmonic response of targets to the incident power density, as at some power density level target's harmonic response tends to saturate. Another indication may be associated with temporal stability of the target's response.

Figure 6:
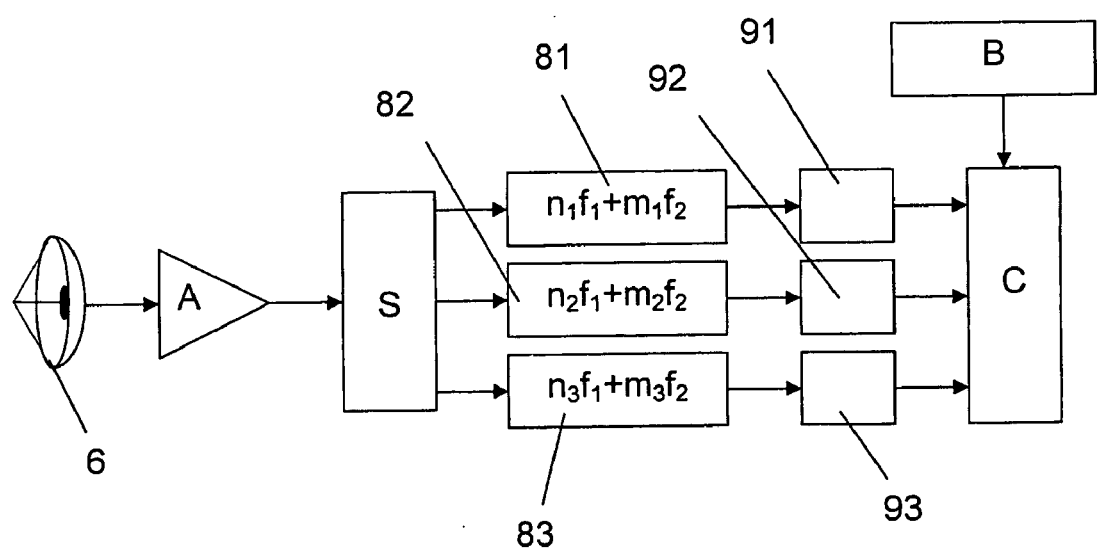
FIG. 6 shows how a classification of objects can be obtained by means of providing a plurality of receiving channels, each tuned to a different harmonic combination of the transmitted signals, and comparing the resulting signals with data obtained experimentally.

In a preferred embodiment (FIG. 6), the receiving antenna 6 is a broad band antenna, that covers a range of frequencies containing at least two harmonics, $n_1 f_1+m_1 f_2$ and $n_2 f_1+m_2 f_2$, where at least $n_1 \neq n_2$ or $m_1 \neq m_2$. The receiver has at least two channels 81-83, a first channel 81 for $n_1 f_1+m_1 f_2$ and a second channel 82 for $n_2 f_1+m_2 f_2$. The received signals pass through the broadband amplifier A, and conveyed into splitter S. The splitter S maneuvers each signal according to its frequency into its corresponding cannel 81, 82, or 83. Detectors 91, 92, and 93 detect the corresponding signals, and the results are correspondingly provided into a comparing and processing unit C. The unit C corresponding compares the ratio of the outputs of these channels with several expected ratios of specific classes of targets, as previously obtained experimentally and stored in database B, to find one class, the ratio of which matches most. The target is classified to the experimental class matches most. Obviously, the ability to classify targets in a system according to the invention increases as the number of channels increases.

Another way for obtaining more information on the targets, and for classifying them is by varying the transmitted frequencies $f_1$ and $f_2$, while following in the receiver the harmonic response $n_1 f_1+m_1 f_2$.

Still another way for obtaining a better classification of targets in a system of the invention is by transmitting more than two frequencies, for example four frequencies $f_1, f_2, f_3$, and $f_4$, and receiving a nonlinear response at a frequency such as $nf_1+mf_2+lf_3+kf_4$, while n, m, l, and k are integers.

While some embodiments of the invention have been described by way of illustration, it will be apparent that the invention can be carried into practice with many modifications, variations and adaptations, and with the use of the numerous equivalents or alternative solutions that are within the scope of persons skilled in the art, without departing from the spirit of the invention or exceeding the scope of the claims.

The invention claimed is:

1. A radar system for detecting man-made objects in a space of interest comprising:
   at least two transmitting units for simultaneously, and in synchronization transmitting electromagnetic radiation pulses in at least two distinct carrier frequencies $f_1, f_2, f_3 \ldots$ respectively towards a space of interest; and
   at least one receiving unit tuned to a frequency of $nf_1+mf_2+qf_3\ldots$, wherein n, m, q ... being integers not equal to zero, for receiving a non-linear response of said radiation from objects located within the said space of interest;
   wherein each of said transmitted pulses has a duration of 1 nanosecond to 10 nanoseconds, enveloping respectively one of said carrier frequencies.

2. A system according to claim 1, wherein the following condition $n\neq 1, m\neq 1,$ and $q\neq 1 \ldots$ also applies.

3. A system according to claim 1, wherein the following condition $n\neq 1, m\neq 1, q\neq -1 \ldots$ also applies.

4. A system according to claim 1, wherein the receiving unit is tuned to receive at least two frequencies $n_1f_1+m_1f_2+q_1f_3\ldots$, and $n_2f_1+m_2f_2+q_2f_3\ldots$, wherein $n_1, m_1, q_1, \ldots, n_2, m_2, q_2 \ldots$, are integers and at least $n_1\neq n_2$ or $m_1\neq m_2$.

5. A system according to claim 1, further comprising evaluating means for evaluating the relative intensity of a response from an object in said received frequencies, and for classifying accordingly the type of the object.

6. A system according to claim 1, comprising two transmitters for simultaneously and in synchronization transmitting electromagnetic radiation pulses in two distinct frequencies $f_1, f_2$ towards a space of interest, and one receiving unit for receiving at a frequency of $n_1f_1+m_1f_2$, n, m, being integers not equal to zero.

7. A system according to claim 1 wherein each transmitting unit comprises a transmitter and a transmitting antenna, and each receiving unit comprises a receiver and a receiving antenna.

8. A system according to claim 1 wherein the at least two antennas of the transmitting units and the at least one antenna of the receiving unit are mounted on a same carrier, and all said antennas are directed in a synchronized manner to simultaneously scan essentially a same space of interest.

9. A system according to claim 1 wherein the transmissions from the transmitting antennas are orthogonally polarized one with respect to the other, for eliminating the production of parasitic signal components at the frequency to which the receiving unit is tuned.

10. A system according to claim 9, wherein the said orthogonal polarization is used for eliminating transmission of signals at the frequency of the receiving unit from any of the transmitting units.

11. A system according to claim 9, wherein the orthogonal polarization is performed by means of a polarizing component located between one of the transmitters and its corresponding antenna.

12. A system according to claim 1 wherein the antennas of the transmitting units and of the at least one receiving unit are all mounted on a same antenna pedestal, to be directed simultaneously to a same direction.

13. A system according to claim 1 wherein a multi-beam antenna is used at the receiving unit for improving the direction resolution.

14. A system according to claim 1, wherein the transmitted frequencies $f_1, f_2, f_3 \ldots$ are in the microwave frequency range.

15. A radar method for detecting man-made objects within a space of interest, comprising the steps of:
   simultaneously transmitting from a first transmitting unit and from a second transmitting unit, and optionally from more transmitting units electromagnetic radiation pulses in carrier frequencies of $f_1, f_2, f_3 \ldots$ respectively towards a space of interest;
   receiving by a receiving unit reflections from objects in said space of interest in a frequency of $nf_1+mf_2+qf_3 \ldots$ wherein n, m, q ... are integers not equal to zero;
   wherein each of said transmitted pulses has a duration of 1 nanosecond to 10 nanoseconds enveloping respectively one of said carrier frequencies.

16. A method according to claim 15, wherein the following condition $n\neq 1, m\neq 1, q\neq 1 \ldots$ also applies.

17. A method according to claim 15, wherein the following condition $n\neq -1, m\neq -1, q\neq -1 \ldots$ also applies.

18. A method according to claim 15, wherein the receiving unit is tuned to receive at least two frequencies $n_1f_1+m_1f_2+q_1f_3\ldots$, and $n_2f_1+m_2f_2+q_2f_3\ldots$, wherein $n_1, m_1, q_1 \ldots, n_2, m_2, q_2 \ldots$, are integers and at least $n_1\neq n_2$ or $m_1\neq m_2$.

19. A method according to claim 15, further comprising:
   a. carrying out repeated experiments by the method according to claim 15, for determining a typical response for each of various types of objects, while using transmitted frequencies $f_1, f_2, f_3 \ldots$ in each transmission unit respectively;
   b. for each object type, recording in a database its typical received response to said transmitted frequencies; and
   c. when receiving a response from a real object whose type is unknown to a simultaneous transmission while using same transmitted frequencies, correlating the response as received with each of said typical records in the database, to find the type having most similarity, and classifying the object type accordingly.

20. A method according to claim 15 wherein the electromagnetic radiation is transmitted in pulses.

21. A method according to claim 15 wherein a receiving gate is provided at the receiver for enabling reception during the expected time of receipt of a response from an object, and disabling receipt in all other times.

22. A method according to claim 20, wherein the pulses are short duration pulses, obtained by means of compression.

23. A method according to claim 15, wherein the transmitted frequencies are varied continuously, and the receiving frequency being also varied respectively to follow the said variation of said transmitted frequencies.

24. A method according to claim 15, further comprising masking the leakage of signal components in the frequency transmitted from any transmitting unit to the other transmitting units.

25. A method according to claim 15, further comprising providing to the receiving unit an indication regarding the time of the simultaneous transmission by the transmitting units, for using it for determining the location of the object.

* * * * *